United States Patent [19]

Kuwahara

[11] Patent Number: 5,784,380
[45] Date of Patent: Jul. 21, 1998

[54] COMMUNICATION CONTROL DEVICE, COMMUNICATION CONTROL METHOD AND COMMUNICATION CONTROL SYSTEM

[75] Inventor: Masanori Kuwahara, Yokohama, Japan

[73] Assignee: Kabushiki Kaisha Toshiba, Tokyo, Japan

[21] Appl. No.: 606,192

[22] Filed: Feb. 23, 1996

[30] Foreign Application Priority Data

Feb. 24, 1995 [JP] Japan .................. 7-036937

[51] Int. Cl.$^6$ .................. H04L 13/00
[52] U.S. Cl. .................. 370/509; 370/522
[58] Field of Search .................. 370/241, 250, 370/252, 509, 522

[56] References Cited

U.S. PATENT DOCUMENTS 5,583,855 12/1996 Ball .................. 370/460

*Primary Examiner*—Melvin Marcelo
*Attorney, Agent, or Firm*—Loeb & Loeb LLP

[57] ABSTRACT

A frame type of transmission data is identified on the basis of identifying information indicating the type of a frame, which is detected from the transmission data transmitted in a frame form, in response to the contents of information constituting the transmission data. A container type of transmission data is identified on the basis of identifying information indicating the type of a container, which is detected from the transmission data transmitted in form of frames, in response to the contents of information constituting the transmission data.

A communication control device automatically identifies types of frames and containers of transmission data, and automatically executes initial setting necessary for disassembling, reassembling or other processing of frames so as to facilitate sending and receiving of transmission data.

20 Claims, 9 Drawing Sheets

FIG. 2A  SOH OF STM-0

FIG. 2B  SOH OF STM-1

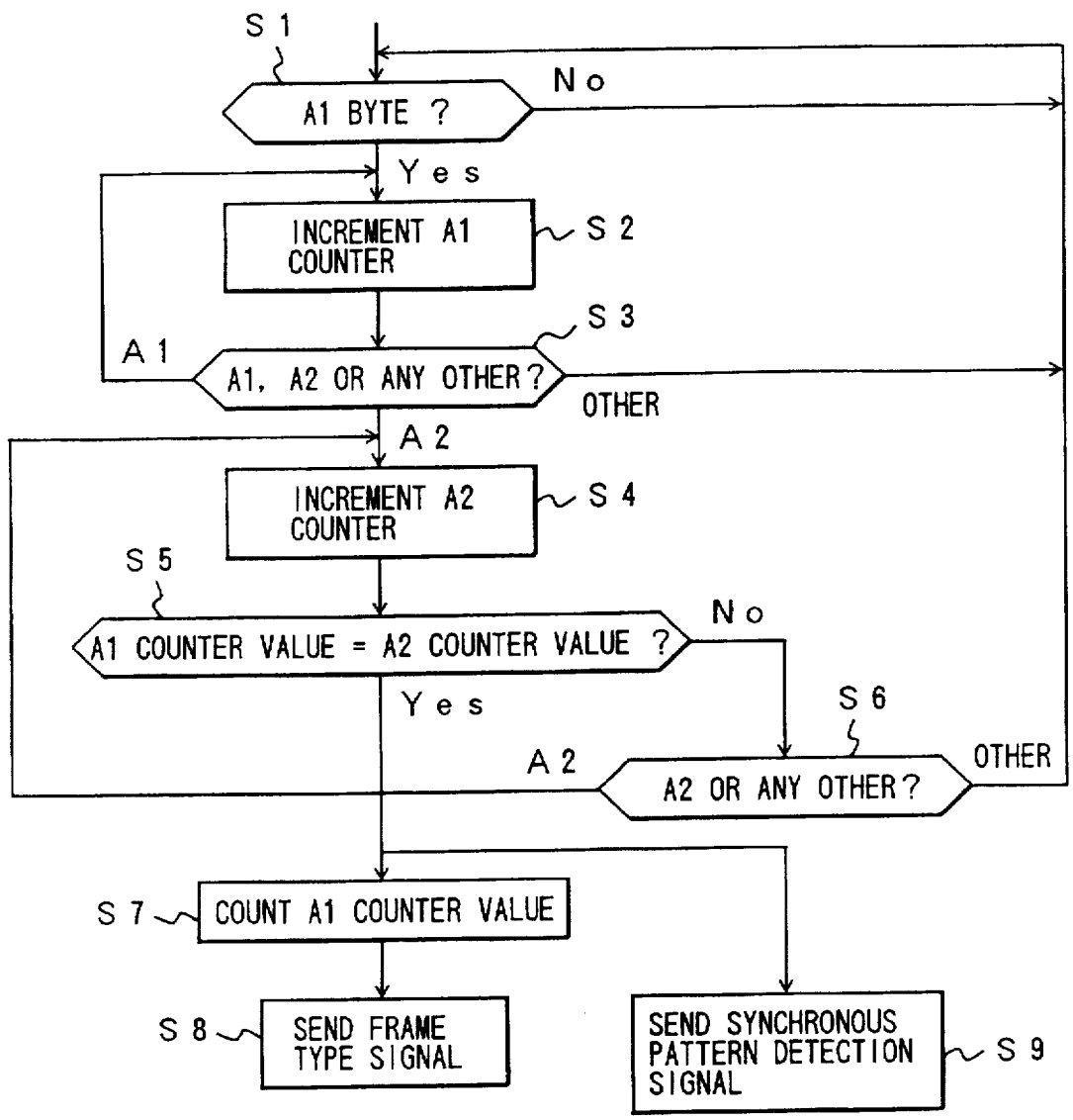
F I G. 5

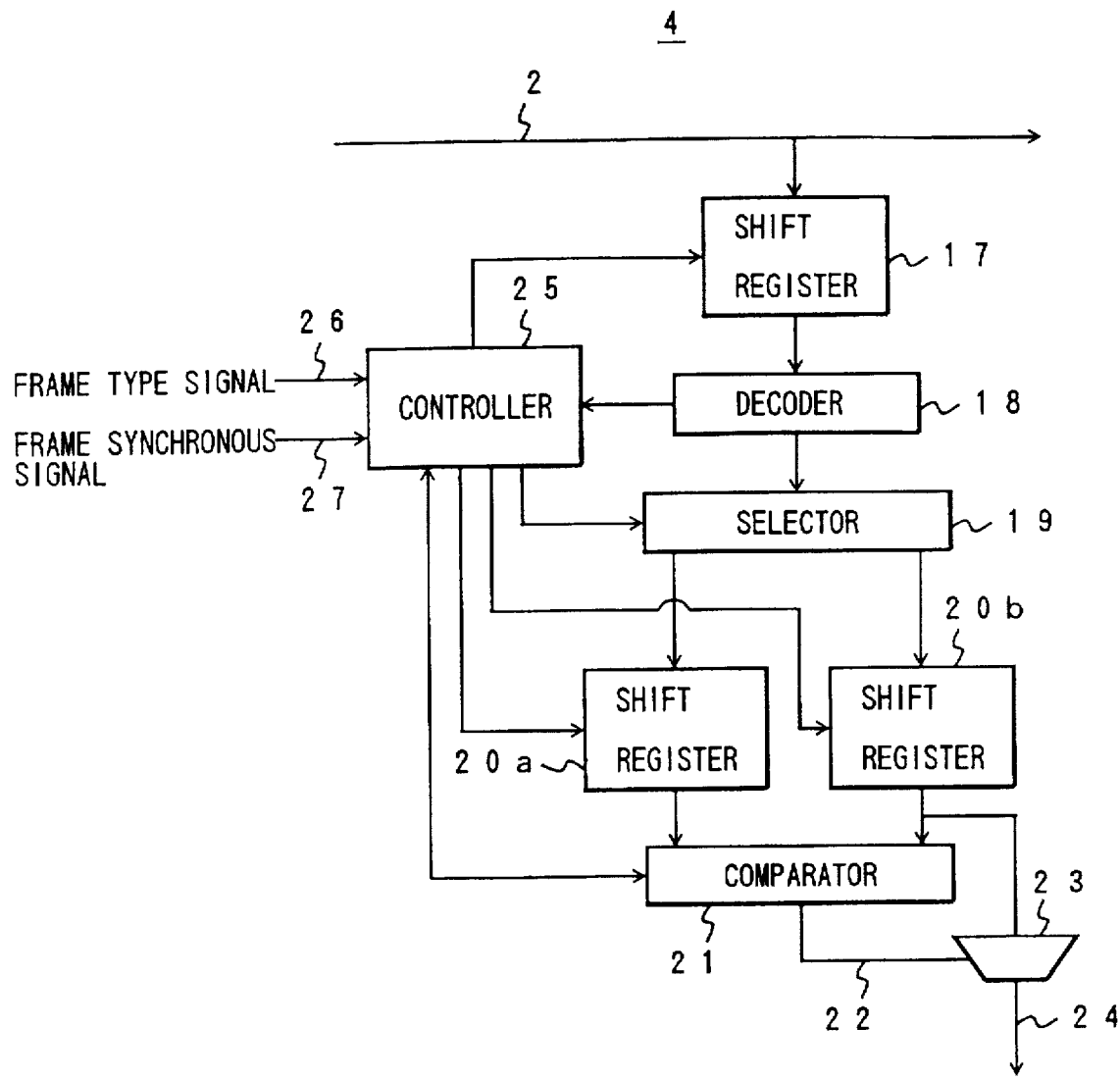
F I G. 6

COMMUNICATION CONTROL DEVICE, COMMUNICATION CONTROL METHOD AND COMMUNICATION CONTROL SYSTEM

BACKGROUND OF THE INVENTION

This invention relates to a communication control device that automatically identifies frame types and container types of data received at a terminal in form of synchronous digital hierarchy (SDH) frames or other frames. The invention also relates to a communication control system in which, even when the type of the line, such as a frame type and a container type, is unknown, initial setting of a terminal device for the line is automatically established to set it ready for communication only by connecting the terminal device to the line.

Communication systems, including Broadband Aspects of Integrated Services Digital Network (B-ISDN), employ the SDH interface as an interface for determining the bit rate of data put on a transmission line. The SDH is a worldwide standard interface regulated by International Telecommunication Union—Telecommunication Standardization Sector (ITU-T, formerly CCITT) for multiplexing communication services of various bit rates raging from existent low bit rates to possible future higher bit rates. In Japan, Telecommunication Technology Committee (TTC) independently regulates as a domestic standard interface a version of SDH including an additional stage of bit rates outside the ITU-T standard.

In SDH interfaces, some bit rates of transmission data are regulated for different frame types. FIG. 8 shows an arrangement of a STM-1 frame having the bit rate of 155.52 Mbps, basic rate of ITU-T SDH, and a process of multiplexing from an existing low bit rate.

In FIG. 8, a frame comprises nine rows and 270 columns in bytes, and data is sent from left to right in each row. The section overhead (SOH) contains information for maintenance and administration of the communication. The area on the right is the portion for containing actual data such as asynchronous transfer mode (ATM) cells, and is packed in a virtual container (VC). The VC is like a box for containing low-speed data, etc. having a standardized bit rate (VC-3: 48.960 Mbps, VC-4: 150.336 Mbps). Added to the first column of the VC is information, called Path Overhead (POH), for controlling containers.

In case of STM-1 (synchronous transport module 1) frames, one VC-4 container, or three VC-3 containers multiplexed by byte interleave, forms one frame. In this case, since the payload portion of STM-1 contains more bytes than the total bytes of three VC-3 containers, stuffing called stuff bytes is inserted in the remainder bytes of the payload of STM-1 when three VC-3 containers are multiplexed.

A process of multiplexing by TTC standard SDH is shown in FIG. 9.

In FIG. 9, even in SDH of TTC standard, STM-1 is the frame having the basic bit rate. Higher-order frames are made by multiplexing N frames of STM-1 and called STM-N. Their bit rates are 155.52×N Mbps (N is an integer).

As referred to above, the TTC standard of Japan provides an additional frame for a low bit rate apart from the group of bit rates obtained by multiplexing STM-1 frames. This is a frame called STM-0 and having the bit rate of 51.84 Mbps, which is obtained by multiplexing one VC-3 as shown in FIG. 9. The size of this frame is one third of STM-1 as shown in FIG. 10.

The communication data having the above structure is transmitted in frames through a transmission line and received at a terminal. The portion adjacent to the terminal line corresponds to the lowest layer, called physical layer, in the hierarchical architecture of the protocol. In the physical layer, SOH, POH and stuff bytes are removed from the received frame, and the part containing data alone (ex. ATM cell of ATM communication) is extracted and delivered to the higher-order layer. These processes (a frame disassembling process) are executed in different ways according to the received frame types (STM-0, STM-1, . . . ) and container types (VC-3, VC-4). For example, in case of STM-0, 87 payload bytes including stuff bytes are sent after three SOH bytes as shown in FIG. 10. In case of STM-1, 261 payload bytes are sent after nine SOH bytes as shown in FIG. 8.

Because of such differences, the process of disassembling a frame must be changed in accordance with types of the received frame and container. To do so, the command program to be given to a processor within the physical layer to control frame disassembling hardware must be changed to meet the received frame types and container types. Therefore, for connecting a terminal to a line to start communication, a user must download a program for frame disassembling, or frame reassembling in a transmission system, into a program memory in the physical layer from external memory by means of a host CPU outside the physical layer LSI. However, for the reason discussed above, the user must know frame types and container types of the data on the transmission line in advance.

Japanese Patent Publication No. 7-14156 discloses a process of synchronous multiplex transmission capable of dealing a plurality of different kinds of signals (virtual containers) in a common multiplex transmission architecture, while keeping them interchangeable. That is, the prior art enables separation in compliance with a particular service by identifying the pattern of pointers, then discriminating the virtual container in the transmitted frame, and identifying the service in the received signal. Additionally, by storing AU (administrative unit) pointer information of a preceding frame and adding pointer processing that compares the stored information with the pattern of currently received AU pointer, and by adding a reliable pointer translation function, two or more kinds of services using a common process can be established while keeping them interchangeable.

As explained above, it is a premise for communication control devices for dealing with communication data of the formats referred to above that each terminal user must previously know the frame types of data on the line. Therefore, particularly when both the frame type and the container type in transferred data are variable, or these types are not known previously, users cannot effect initial setting (download of a program) for disassembling/reassembling of frames in the physical layer LSI and cannot start communication.

Moreover, since initial setting of each terminal device relies on user's own job, it takes a man-hour. These problems constitute a bar for developing a communication device easily used even by an average user not having a sufficient knowledge on computers and related systems.

SUMMARY OF THE INVENTION

It is therefore an object of the invention to provide a communication control device facilitating transmission of data by automatically identifying types of frames and containers of transmission data. It is a further object of the invention to provide a communication control system facilitating transmission of data, in which a device automatically identifies types of frames and containers of transmission data and automatically executes initial setting necessary for disassembling/reassembling of frames.

According to the invention, there is provided a communication control device and a communication control method which detect distinctive information indicating the type of frames in accordance with contents of information constituting transmission data from transmission data transmitted in form of frames; identify the frame type of the transmission data on the basis of the distinctive information detected; detects distinctive information indicating the type of containers in accordance with contents of information constituting transmission data from transmission data transmitted in form of frames; and identify the container type of the transmission data on the basis of the distinctive information detected.

According to the invention, there is also provided a communication control system which detects distinctive information indicating the type of frames in accordance with contents of information constituting transmission data from transmission data transmitted in form of frames; identifies the frame type of the transmission data on the basis of the distinctive information detected; detects distinctive information Indicating the type of containers in accordance with contents of information constituting transmission data from transmission data transmitted in form of frames; and identifies the container type of the transmission data on the basis of the distinctive information detected; selects a program for processing frames of the transmission data in accordance with the detected frame typo and container type; and executes frame processing of the transmission data according to the program selected.

Since a device according to the invention includes a frame type identification circuit for identifying types of frames and a container type identification circuit for identifying types of containers, the device itself can automatically identifying a frame type and a container type. Therefore, this device does not require users' own jobs for identifying a frame type and a container type and for giving a receiver a prior notice on a frame type and a container type of the transmission data. That is, identification of types of frames and containers of transmission data is carried out automatically. In addition, communication can be very readily started and transmission of data can be facilitated both in a sender and in a receiver.

Another aspect of the invention can automatically establish initial setting necessary for disassembling, reassembling and other processing of frames of received data by reading a program adaptive to identified types of frame type and a container type and by executing the initial setting in accordance with the program.

According to an additional aspect of the invention in which information indicating a container type is determined proper when it is identical in continuous frames, a container type can be identified correctly even if any exceptional processing is applied to the information indicating the container type.

BRIEF DESCRIPTION OF THE DRAWINGS

FIG. 2A is a diagram showing a structure of SOH of a STM-0 frame, and FIG. 2B is a diagram showing a structure of SOH of a STM-1 frame;

FIGS. 3A to 3E are diagrams showing structures of respective first six bytes of AU pointers of STM-1 frames;

FIG. 5 is a flow chart showing a process of the frame type identification circuit shown in FIG. 4;

FIG. 6 is a diagram showing a construction of a container type identification circuit shown in FIG. 1;

DESCRIPTION OF THE PREFERRED EMBODIMENTS

Some embodiments of the invention are described below with reference to the drawings.

Figure 1:
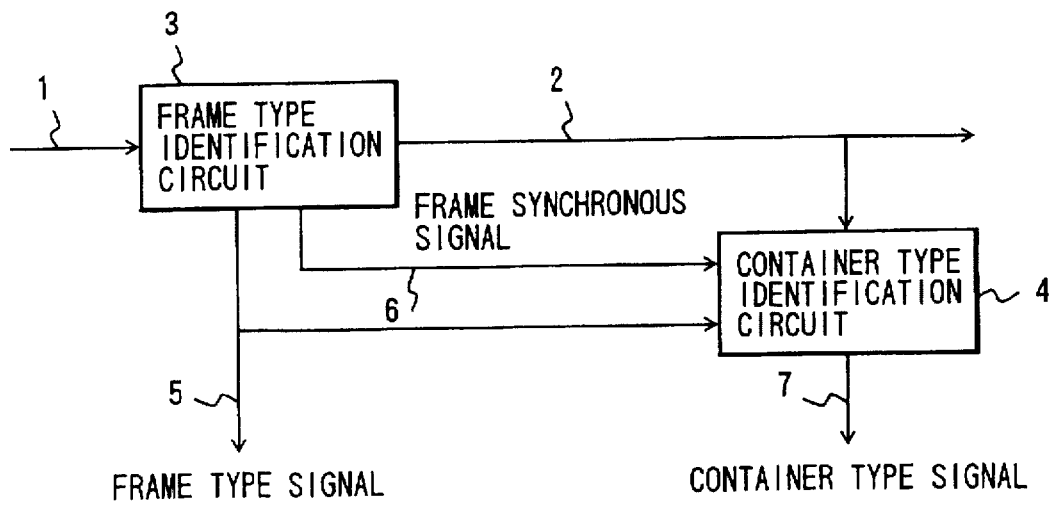
FIG. 1 is a diagram showing a construction of a communication control device according to an embodiment of the invention.

FIG. 1 is a diagram showing a construction of a communication control device according to an embodiment of the invention.

First explained is a principle for discriminating and identifying a frame type and a container type of communication data prior to explanation of the construction of the embodiment.

FIG. 2A shows the content of SOH of a STM-0 frame, and FIG. 2B shows the content of SOH of a STM-1 frame.

In FIG. 2B, bytes with the mark * are unscrambled bytes, those with X are undefined bytes reserved for the domestic use, and blank bytes are undefined bytes reserved for future international standards.

In FIGS. 2A and 2B, a frame type and a container type are identified by particular bytes in SOH. A1 and A2 bytes are fixed bytes for frame synchronization, and have the values of F6H and 28H, respectively. One STM-0 frame has one A1 byte and one A2 byte, and one STM-1 frame has three A1 bytes and three A2 bytes. Therefore, by knowing the numbers of A1 bytes and A2 bytes, the type of the frame can be identified. Identification of a type of the frame is made more accurate by establishing behind-protective synchronization in compliance with the length of the frame.

Next explained is a method for discriminating a container type.

In case of STM-0, since the container is exclusively VC-3, once the frame is identified as STM-0, the type of the container is definitely determined. In case of STM-1, bytes labelled with AU Pointer are remarked. AU pointers indicate leading positions of containers multiplexed in a frame. To identify the type of a container, first six bytes in the AU pointer are necessary in case of STM-1. Although STM-1 is taken as an example for explanation in this text, this can be readily applied to STM-N.

FIG. 3A through 3E show arrangements of respective first six bytes of AU pointers of STM-1. In these figures, H1= (1001SSXX) or (0110SSXX), Y=(1001SS11), H2= (XXXXXXXX), and 1*=(11111111) where SS=10, X is an unfixed bit for indicating the start position of the container, and I is a byte defined by the present invention, which is, for example, (10000000).

The arrangement of FIG. 3A is that of an AU pointer used when one VC-4 is multiplexed. Since this arrangement only needs a single pair of H1 and H2, Y bytes and 1* bytes are inserted in the remainder bytes.

FIG. 3B shows an arrangement of an AU pointer used when three VC-3 containers are multiplexed. In this arrangement, the first (second, third) H1 byte from the left end and the fourth (fifth, sixth) H2 byte make a pair, and indicate the first (second, third) start position of the container. For example, ten bits (expressed X above) combining last two bits of the H1 byte in the first position from left and eight bits of the H2 byte in the fourth position from left express a number from 0 to 782 (decimal numbers) (87×9= 783), and the value of the number indicates the start position of the first container. Start positions of the second and third containers are also indicated in the same manner.

Arrangements of FIGS. 3C through 3E are AU pointers corresponding to possible expected container multiplexing types which are, however, not specified by either the ITU-T standard or the TTC standard. Those of FIGS. 3C and 3D intend loading only one VC-3 container in a STM-1 frame. The arrangement of FIG. 3E is for loading two VC-3 containers.

By monitoring the combination of H1, H2, Y, 1* and I bytes appearing in an AU pointer, the type of the container can be known. There are three combinations of bytes making pairs (for example, first and fourth bytes from left): (H1, H2), (Y, 1*) and (Y, I), which are never confused with each other. More specifically, the I byte is defined according to a condition which will be explained later. Therefore, by reviewing which combination a pair is and where in the AU pointer the members of the pair appear, the type and the number of containers can be known.

Since H1 and Y bytes, and H2 and 1* bytes, can take the same values, respectively, as apparent from the abovementioned bit arrangements of H1, H2, Y and 1* bytes, one may consider that the (H1, H2) pair and the (Y, 1*) pair are not distinguished and that the type of FIG. 3A and the type of FIG. 3B cannot be distinguished by mere review of them. Actually, however, they are certainly distinguished because the values (1111111111) combining last two bits of the Y byte and the bits of the 1* byte surpasses 782 (decimal number) and cannot be the value of (H1, H2) pair. Taking them into account, definition of each I byte must satisfy the following conditions to distinguish the (H1, H2) pair and the (Y, I) pair from each other. That is, ten bits combining last two bits (11) of the I byte and bits of the I byte must be a number larger than 782 (decimalized). As long as this condition is satisfied, any definition of I bytes may be employed.

Having explained above the essential of the container identifying method, given below is an explanation of exceptional operations of AU pointers.

Exceptional operations pertain to incremental processing and decremental processing of AU pointers. When fine phase differences between the clock of the physical layer and the clock of the upper layer for direct delivery of data to and from the physical layer accumulate to a non-negligible value, the phase difference of the clocks is adjusted in the transmitter-side physical layer by taking one byte of the payload into a given portion of SOH and shifting all subsequent data forward by one byte, or by inserting a bland byte into the payload and shifting all subsequent data rearward by one byte. Namely, the value of the AU pointer is reduced (decremented) by 1 in the former case and increased (incremented) by 1 in the latter case. After that, for notifying the receiver-side physical layer that the processing has been done, the eighth bit of the H1 byte and the second, fourth, sixth and eighth bits of the H2 byte of the AU pointer in the frame are sent in the reversed form in the case of decrement, and the seventh bit of the H1 byte and first, third, fifth and seventh bits of the H2 byte are sent in the reversed form in the case of increment.

In receipt of the AU pointer having reversed bits for the exceptional processing, it is possible that one or more bytes are not read or are considered other bytes. To prevent these errors, AU pointers of two frames are monitored so that the container type is identified from the contents of the AU pointers when they coincide; if the contents of the AU pointers are different, then the device regards them as the notice of incremental or decremental processing, and identifies the type of the containers only when the contents of AU pointers of successive two frames coincide.

The essence of container identification is to extract data having information on the container type from received data and to identify the container type referring to the extracted data. Therefore, any signals not limited to those bytes of AU pointers may be used to make the data provided it has information on a container type. For example, if a container type is written in undefined bytes in SOH at a sender side, a receiver, in receipt of the data, can read and Identify the container type. This is applicable also to identification of a frame type in exactly the same manner.

Now returning back to FIG. 1, construction of the embodiment is explained below.

In FIG. 1, numerals 1 and 2 denotes data buses for transfer of received data. Numeral 3 denotes a frame type identification circuit, and numeral 4 a container type identification circuit. Received data flows from the data bus 1 toward the data bus 2. Numeral 5 is a signal line for notifying a frame type identified by the frame type identification circuit 3 to the exterior. Numeral 6 denotes a signal line for informing the container type identification circuit that frame synchronization is established in the frame type identification circuit 3. Numeral 7 is a signal line for notifying a container type identified by the container type identification circuit 4 to the exterior.

Figure 4:
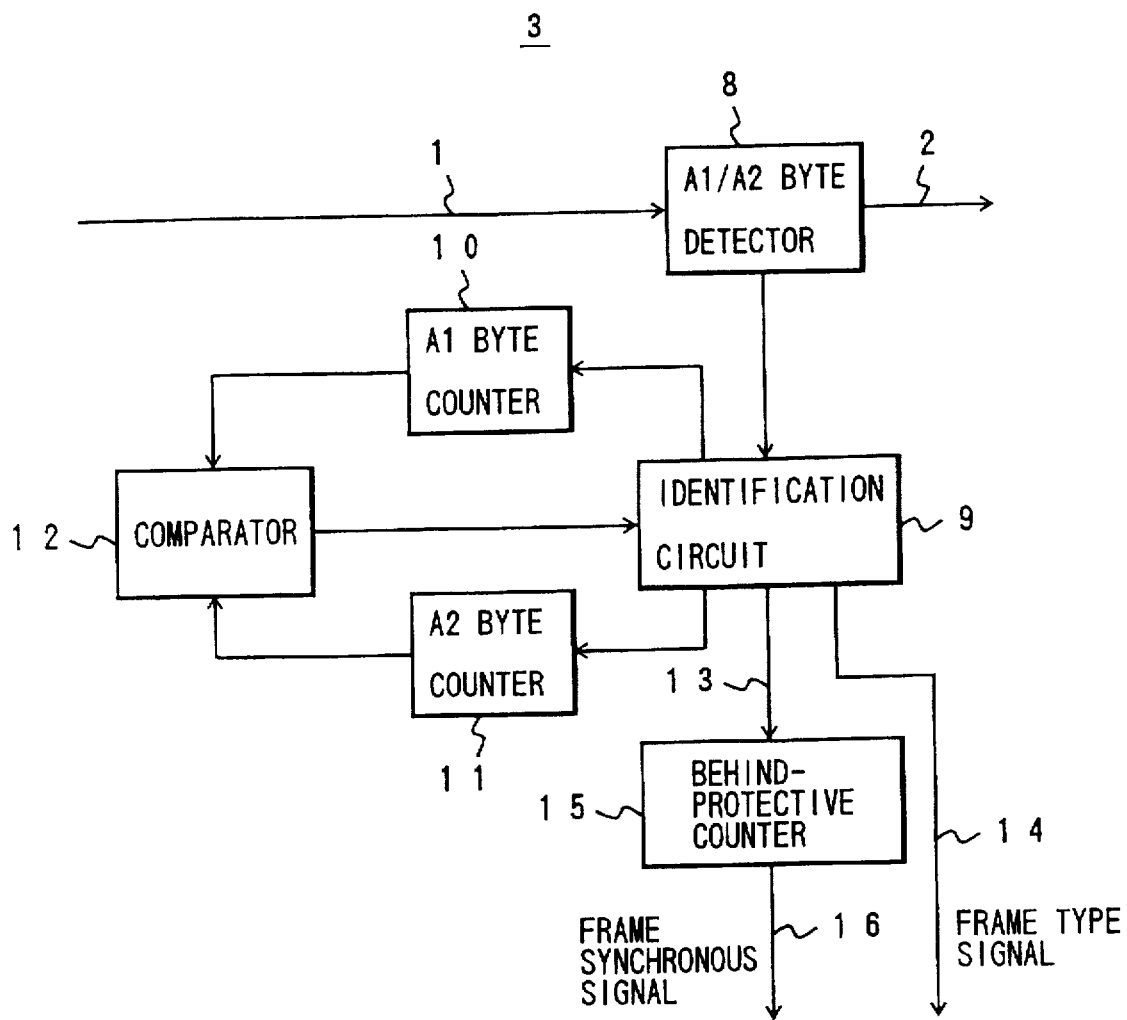
FIG. 4 is a diagram showing a construction of a frame type identification circuit shown in FIG. 1.

FIG. 4 shows a specific construction of the frame type identification circuit 3 shown in FIG. 1. In FIG. 4, numeral 8 designates a detector that detects A1 bytes or A2 bytes in the received data on the data bus 1 and has a signal line for notifying whichever bytes its detects. Numeral 9 is an identification circuit that executes identification of a frame type and related controls. Numerals 10 and 11 are an A1 byte counter and an A2 byte counter for counting occurrences of detection of A1 bytes and A2 bytes, respectively. Numeral 12 is a comparator that compares the value of the A1 byte counter and that of the A2 byte counter and has a signal line for notifying that both values coincide. Numeral 13 is a signal line through which a synchronous pattern detection signal for notifying the frame type identified by the identification circuit 9. Numeral 14 is a frame type signal line for notifying the frame type identified by the identification circuit 9. Numeral 15 is a behind-protective counter that counts occurrences of successively generated frame synchronous patterns detected. Numeral 16 designates a frame synchronous signal line for notifying that the value of the behind-protective counter 15 amounts a predetermined number of behind-protective stages.

Behaviors of the above construction is explained below with reference to the flow chart of FIG. 5 (algorithm).

The A1/A2 byte detector 8 detects bit streams (F6H) corresponding to A1 bytes from the received data on the data bus 1 (step S1). If an A1 byte is detected, then the identification circuit 9 receives the notice and increments the A1 counter 10 that counts the number of A1 bytes (step S2). If the next bytes is again an A1 byte, the circuit continues to increment the A1 counter 10. When any "other" byte other than A1 and A2 bytes is detected, the identification circuit 9 determines that the bytes detected heretofore is not a part of the synchronous pattern, and resets the A1 counter to start the algorithm from the beginning.

On the other hand, if an A2 byte is detected next to the A1 byte (step S3), the identification circuit 9 increments the A2 counter 11 (step S4), and then receives a notice on the result of comparison from the comparator 12 that compares the value of the A1 counter 10 with the value of the A2 counter 11. If the result of comparison indicates that the values do not coincide (A1 counter value ≠A2 counter value) (step S5), the next byte is reviewed to know whether it is an A2 byte or not (step S6). If it is an A2 byte, then the A2 counter 11 is incremented (step S4), and the next result of comparison is monitored (step S5).

While these steps are repeated, when the values of two counters coincide (A1 counter value=A2 counter value), it is determined that a frame synchronous pattern has been detected. On the other hand, if any byte other then A2 bytes is detected before the number of A1 bytes and the number of A2 bytes become equal, A1 and A2 bytes detected heretofore are regarded not to constitute the synchronous pattern, and the process returns to the initial step.

When the frame synchronous pattern is detected, the identification circuit 9 counts up the value of the A1 counter (step S7). If the value of the A1 counter is 1, the identification circuit 9 determines that the frame is an STM-0 frame. If the value of the A1 counter is 0, the circuit determines that the frame is an STM-1 frame. Then, the circuit outputs a frame type signal responsive to the value of the A1 counter through the signal line 14 (step 88). At the sane time, a synchronous pattern detection signal is sent to the behind-protective counter 15 through the signal line 13 (step S9). When a given number (the number of behind-protective stages) synchronous pattern detection signals is sent continuously, the behind-protective counter 15 outputs a high-level frame synchronous signal to the frame synchronous signal line 16.

FIG. 6 shows an arrangement of the container type identification circuit 4 shown in FIG. 1.

In FIG. 6, numeral 17 denotes a shift register that picks up and stores necessary bits in AU pointers. Numeral 18 denotes a decoder that decodes the bit stored in the shift register 17 and identifies sorts of bytes constituting AU pointers. 19 designates a selector for delivering an output of the decoder 18 to one of shift registers 20a and 20b. Numeral 21 is a comparator which compares outputs of the shift registers 20a, 20b, and outputs a high-level coincidence signal to a signal line 22 when they are identical. Numeral 23 is a gate circuit which delivers an output of the shift register 20b to a signal line 24 for notifying the container type when the signal line 22 exhibits the high level. Numeral 25 is a controller which receives the frame type signal and the frame synchronous signal from the frame type identification circuit 3, receives the result of the decoding from the decoder 18, receives the result of the comparison from the comparator 21, and controls behaviors of the shift register 17, selector 19, shift registers 20a, 20b, and comparator 21.

In the construction mentioned above, when the frame synchronous signal is sent from the frame type identification circuit 3 through a signal line 27 to notify that frame synchronization has been established, the controller 25 starts its operation and executes controls responsive to this frame type notified via the signal line 26.

First, the shift register 17 picks up and stores necessary bits in an AU pointer from the data bus 2. As explained before with reference to the principle for identification of a container type, bits to be stored are last two bits of each byte for first three bytes of the AU pointer, and all bits of each byte for subsequent three bytes. Therefore, the shift register 17 stores 30 bits (10 bits×3 sets) in total.

The decoder 18 evaluates from the contents of the shift register 17 whichever arrangement of H1, H2, Y, I* and I bytes the AU pointer has, according to the method explained with reference to the principle of identification of a container type, end outputs an interim container type. If the AU pointer undergoes increment or decrement processing, it is possible that none of H1, H2, Y, 1* and I bytes cannot be read in the AU pointer by bit evaluation of bits. In this case, the decoder 18 notifies the controller 25 that no byte could not be read, and the controller 25 repeats the reading operation from the next frame.

Even when the bytes can be read, there still remains the possibility that the bytes were read erroneously due to reverse of bits, and it is confirmed whether the interim container type output from the decoder 18 has been identified exactly. For this purpose, the selector 19 gives the output of the decoder 18 for this frame to the shift register 20a and gives the output of the decoder 18 for the next frame to the other shift register 20b.

The comparator 21 compares the contents of the shift register 20a with the contents of the shift register 20b. If they coincide, which allows the decision that no increment or decrement processing has been done, the comparator 21 regards that the container type has been identified correctly, and outputs a high-level coincidence signal to the signal line 22. Responsively, the gate circuit 23 opens, and outputs the container type stored in the shift register 20b through the signal line 24.

Figure 11:
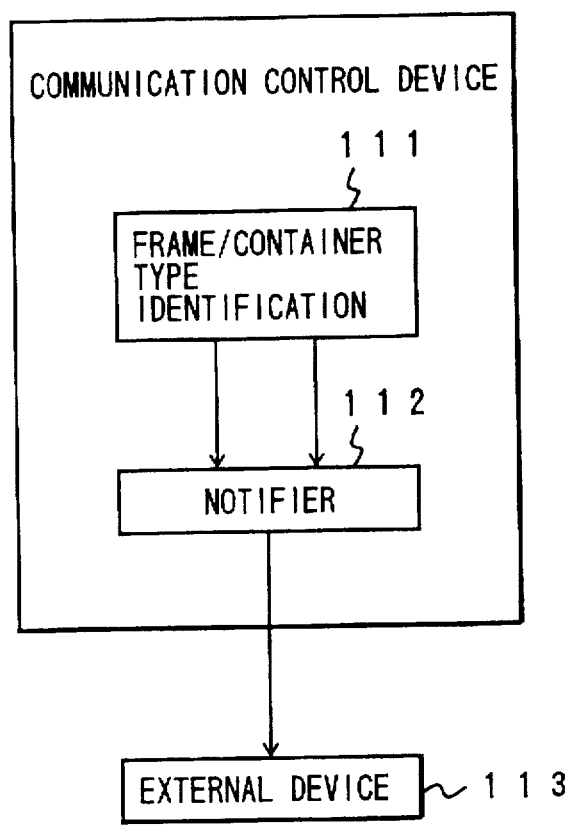
FIG. 11 is a diagram showing a construction of a communication control device according to a still further embodiment of the invention, which includes a notification means.

FIG. 11 shows a communication control device having a notification means.

Numeral 111 denotes a frame/container type identification circuit corresponding to the circuit shown in FIG. 1. 112 denotes notification means which is an interface for introducing and externally delivering outputs of the frame/container type identification circuit 111 indicating a frame type and a container type. The notification means 112 may include a converter for conversion of signal formats, parallel-to-serial conversion, or the like, or may be made of plugs, connectors, etc. Numeral 113 designates an external device, which may comprise a computer including a CPU or its equivalent, to effectively utilize output a frame type and/or a container type. The external device 113 may include a visible display device, such as LED, liquid crystal panel, CRT, etc., or an audible display device. Also, the external device 113 may involve any desired device connected to it, such as a printer or other output devices, and/or a floppy disk drive, a hard disk drive or other storage devices.

Figure 7:
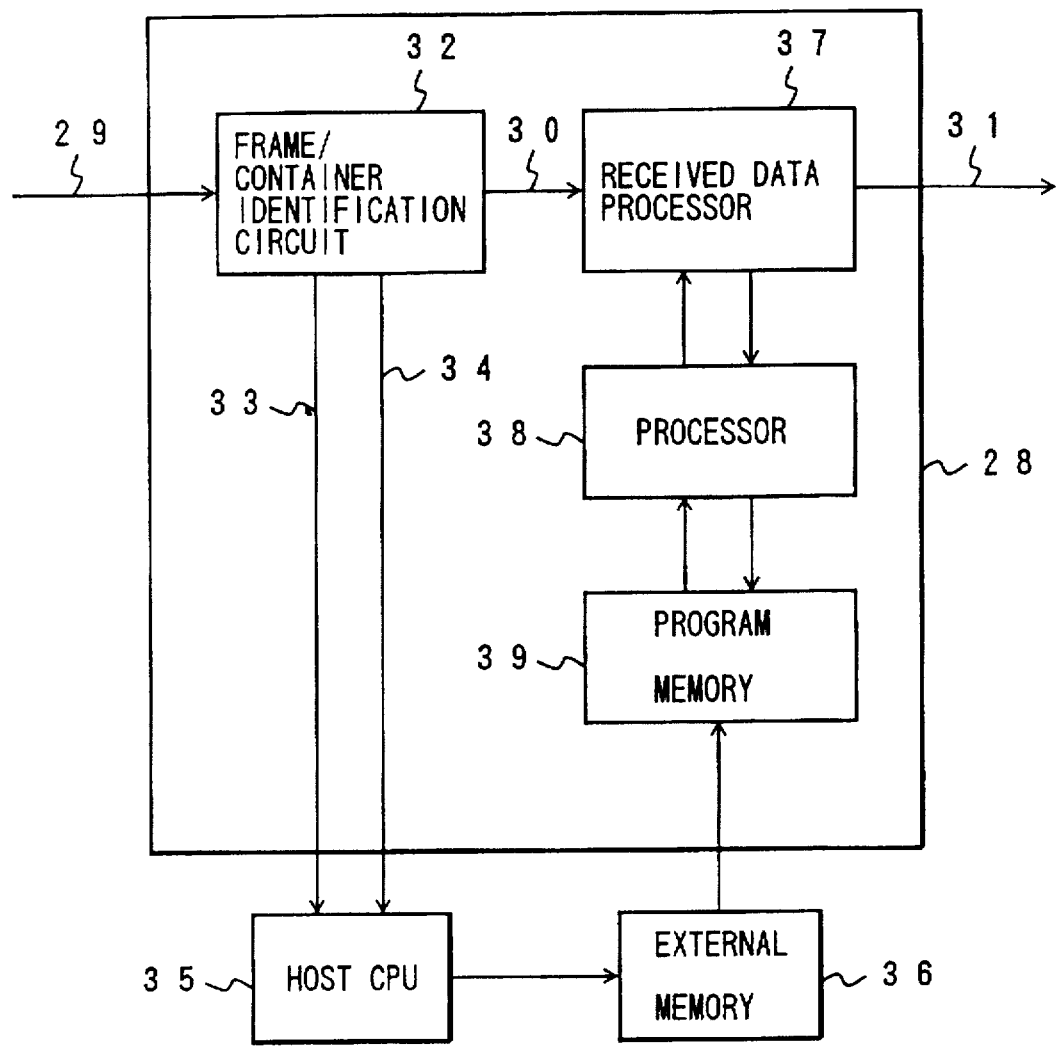
FIG. 7 is a diagram showing a construction of a communication control system according to a further embodiment of the invention.
Figure 8:
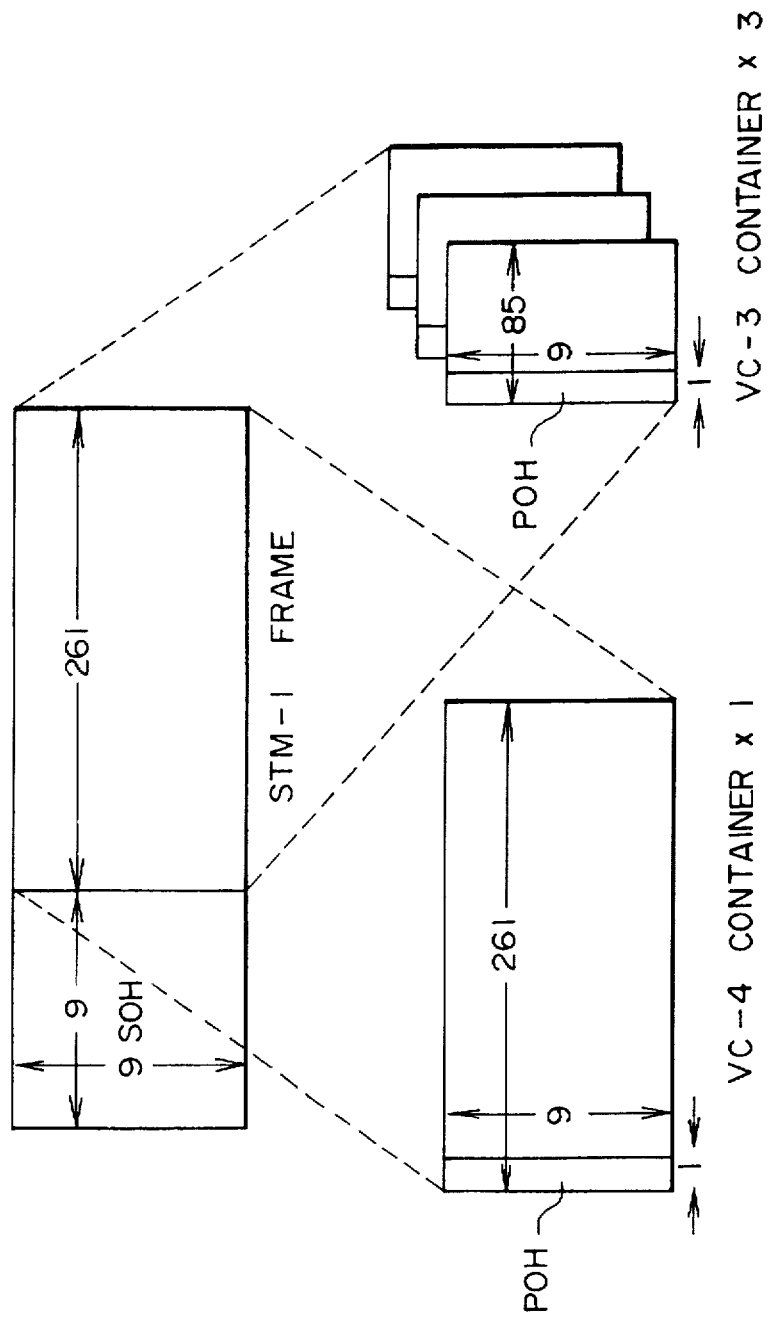
FIG. 8 is a diagram showing structures of a STM-1 frame.
Figure 9:
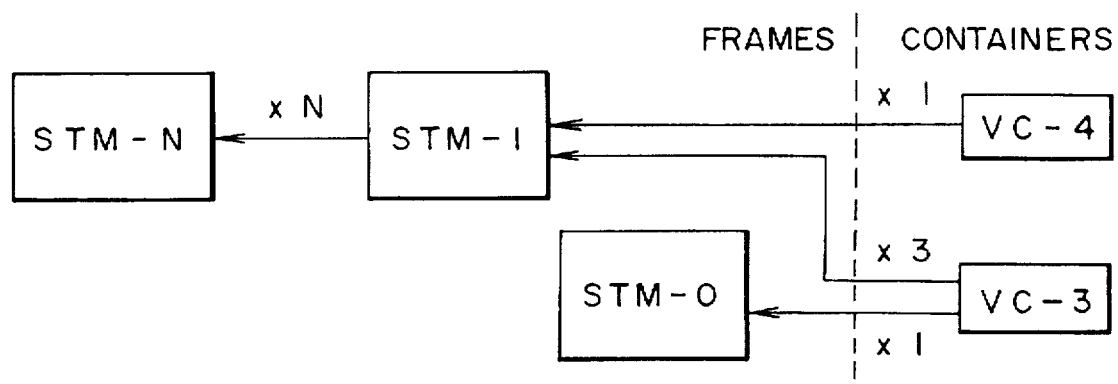
FIG. 9 is a diagram showing a process of multiplexing by a TTC standard SDH interface.
Figure 10:
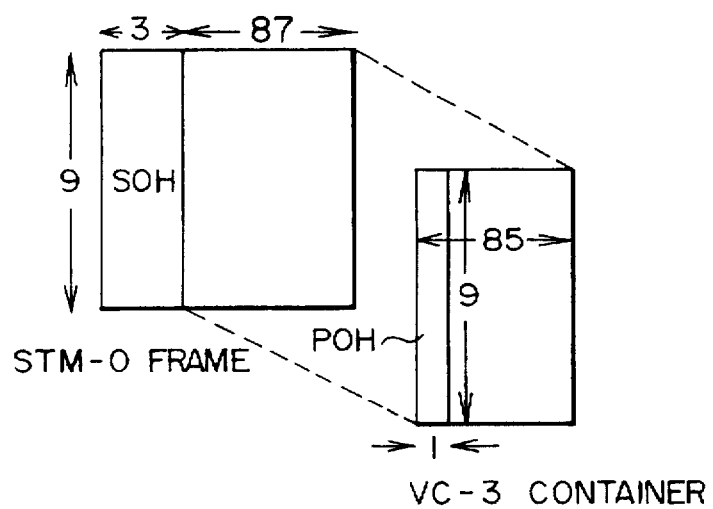
FIG. 10 is a diagram showing the structure of a STM-0 frame.

FIG. 7 shows an arrangement of a communication control system taken as another embodiment of the invention.

The embodiment of FIG. 7 is an embodiment which uses a communication control device including the above-described frame/container type identification circuit to automatize initial setting of the physical layer, which is required to set up terminal devices.

Numeral 28 denotes a communication device which may be integrated into an LSI, together with additional appropriate means other than those shown in FIG. 7, if desired.

In the communication control device 28, numerals 29, 30 and 31 are receiver data buses. Numeral 32 is a frame/container type identification circuit corresponding to the circuit shown in FIG. 1. Numerals 33 and 34 designate signal lines through which a frame type signal and a container type signal are delivered, respectively. Numeral 35 is a host CPU which supervises the entirety of terminal devices outside the physical layer LSI operating as the communication control device. Numeral 36 is an external memory. Numeral 37 is a received data processor for processing received data in the physical layer, which may be, for example, a received frame processor. Numeral 38 is a processor for controlling the received data processor 37, and numeral 39 denotes a program memory for storing a command program to be applied to the processor 38.

In this construction, the frame/container type identification circuit 32 establishes frame synchronization from received data via the data bus 29, then identifies the frame type and the container type, and gives the frame type signal 33 and the container type signal 34 to the host CPU 35. The host CPU 35 instructs the external memory 36 to download into the program memory 39 in the communication control device a processing program suitable for the identified frame type and container type. Pursuant to the command program, the processor 38 executes frame disassembling and other necessary processing to the received data processing circuit 37. Also for reassembling frames, substantially the same process as the frame disassembling is executed by using a frame reassembling program. All a user has to do in this process is merely inserting a plug of the terminal device into a socket of the transmission line.

Therefore, by making a terminal device itself to automatically identify the frame type and the container type of data on the line and to notify a host CPU to down-load a data processing program in accordance with the identified types, initial setting of the physical layer heretofore relying on users' own job can be automatized. As a result, users are greatly released from tasks for starting communication, and even an average user not having a sufficient knowledge in the related field can very easily start communication.

What is claimed is:

1. A communication control device comprising:
   first detector means for detecting first specific information in transmission data transmitted in a frame form;
   first identification means responsive to a result of the detection by said first detector means to identify a frame type of said transmission data;
   second detector means for detecting second specific information in transmission data transmitted in a frame form; and
   second identification means responsive to a result of the detection by said second detector means to identify a container type of said transmission data.

2. The communication control device according to claim 1, wherein said first detector means detects two kinds of frame synchronous information from control information in said transmission data; and
   said first identification means identifies the frame type with reference to said two kinds of frame synchronous information detected by said first detector means and outputs a frame type signal.

3. The communication control device according to claim 1, wherein said frame form has a structure of a synchronous digital hierarchy (SDH) frame,
   wherein said first detector means includes a detector for detecting first and second frame synchronous information from section overheads (SOH) of respective frames, and
   wherein said first identification means includes:
   a counter for counting occurrences of said first and second frame synchronous information detected by said first detector means; and
   a first identification circuit which determines that a frame synchronous pattern has been detected when counted values of said first and second frame synchronous information are equal, and then outputs a frame type signal of a synchronous transport module (STM) corresponding to the counted value.

4. The communication control device according to claim 3, wherein said first identification means includes a second identification circuit which counts up occurrences of said frame synchronous pattern when said frame synchronous pattern has been detected, then determines that frame synchronization has been established when the counted value of said frame synchronous patterns reaches a predetermined number, and subsequently outputs a frame synchronous signal.

5. The communication control device according to claim 1, wherein said second detector means detects information indicating a data header position from control information in the transmission data, and wherein said second identification means identifies the arrangement of said information indicating the data header position detected by said second detector means, and outputs a container type corresponding to the identified arrangement.

6. The communication control device according to claim 1, wherein said second detector means detects indicative information indicating a data header position from control information in the transmission data, and wherein said second identification means identifies the arrangement of said information indicating the data header position according to a frame type signal outputted by said first identification means and said information indicating the data header position detected by said second detector means, and outputs a container type corresponding to the identified arrangement.

7. The communication control device according to claim 1, wherein said frame form has a structure of a SDH frame,
   wherein said second detector means includes a detector for detecting a pointer indicating a data header position from SOHs of respective frames, and
   wherein said second identification means includes a third identification circuit which discriminates the arrangement of each said pointer detected by said second detector means, and identifies the container type of virtual containers corresponding to a combination in said arrangement.

8. The communication control device according to claim 7, wherein said second identification means includes:
   first memory for storing container type information identified by said third identification circuit for a particular one of said frames;
   second memory for storing container type information identified by said third identification circuit for another of said frame subsequent to said particular frame;
   a comparator for comparing the container type information stored in said first memory with that in said second memory; and
   an output responsive to a result of the comparison indicating coincidence of both information to determine that the container type of frames in the received data has been identified correctly and to output the container type.

9. The communication control device according to claim 1, wherein said frame form has a structure of a SDH frame, wherein said first detector means includes a detector for detecting frame type information from undefined regions in SOH of each frame, and wherein said first identification means includes an identification circuit for outputting a frame type signal of a STM corresponding to said frame type information detected by said first detector means.

10. The communication control device according to claim 1, wherein said frame form has a structure of a SDH frame, wherein said second detector means includes a detector for detecting container type information from undefined regions in SOH of each frame, and wherein said second identification means includes an identification circuit which identifies the container type of virtual containers corresponding to said container type information detected by said second detector means.

11. The communication control device according to claim 1, further comprising notifying means for notifying the frame type and/or the container type to an external circuit.

12. A communication control method comprising:

a first detecting step that detects first specific information in transmission data transmitted in a frame form;

a first identifying step that identifies a frame type in said communication data on the basis of a result of the detection by said first detecting step;

a second detecting step that detects second specific information in transmission data transmitted in a frame form; and a second identifying step that identifies a container type in communication data on the basis of a result of the detection by said second detecting step.

13. The communication control method according to claim 12, wherein said first detecting stop detects two kinds of frame synchronous information from control information in said transmission data; and said first identifying step identifies the frame type with reference to said two kinds of frame synchronous information detected by said first detecting step and outputs a frame type signal.

14. The communication control method according to claim 12, wherein said second detecting step detects information indicating a data header position from control information in the transmission data, and wherein said second identifying step identifies the arrangement of said information indicating the data header position detected by said second detecting step, and outputs a container type corresponding to the identified arrangement.

15. The communication control method according to claim 12, further comprising notifying step for notifying the frame type and/or the container type to an external circuit.

16. A communication control system comprising:

frame type identification means for identifying a frame type in transmission data on the basis of specific information constituting said transmission data;

container type identification means for identifying a container type in transmission data on the basis of specific information constituting communication data;

a memory for storing processing programs in accordance with the frame type and the container type in transmission data;

controller for selecting one of said processing programs associated with the frame type and the container type identified by respective said identification means; and processor for executing controls concerning said transmission data in accordance with said selected processing program.

17. The communication control system according to claim 16, wherein said frame type identification means includes:

first detector means for detecting first specific information in transmission data transmitted in a frame form; and first identification means responsive to a result of the detection by said first detector means to identify a frame type of said transmission data; and wherein said container type identification means includes:

second detector means for detecting second specific information in transmission data transmitted in a frame form; and second identification means responsive to a result of the detection by said second detector means to identify a container type of said transmission data.

18. The communication control system according to claim 17, wherein said first detector means detects two kinds of frame synchronous information from control information in said transmission data; and said first identification means identifies the frame type with reference to said two kinds of frame synchronous information detected by said first detector means and outputs a frame type signal.

19. The communication control system according to claim 17, wherein said second detector means detects information indicating a data header position from control information in the transmission data, and wherein said second identification means identifies the arrangement of said information indicating the data header position detected by said second detector means, and outputs a container type corresponding to the identified arrangement.

20. The communication control system according to claim 17, further comprising notifying means for notifying the frame type and/or the container type to an external circuit.

* * * * *